May 28, 1935.   A. Y. DODGE   2,003,108
VARIABLE SPEED TRANSMISSION
Filed Dec. 12, 1932
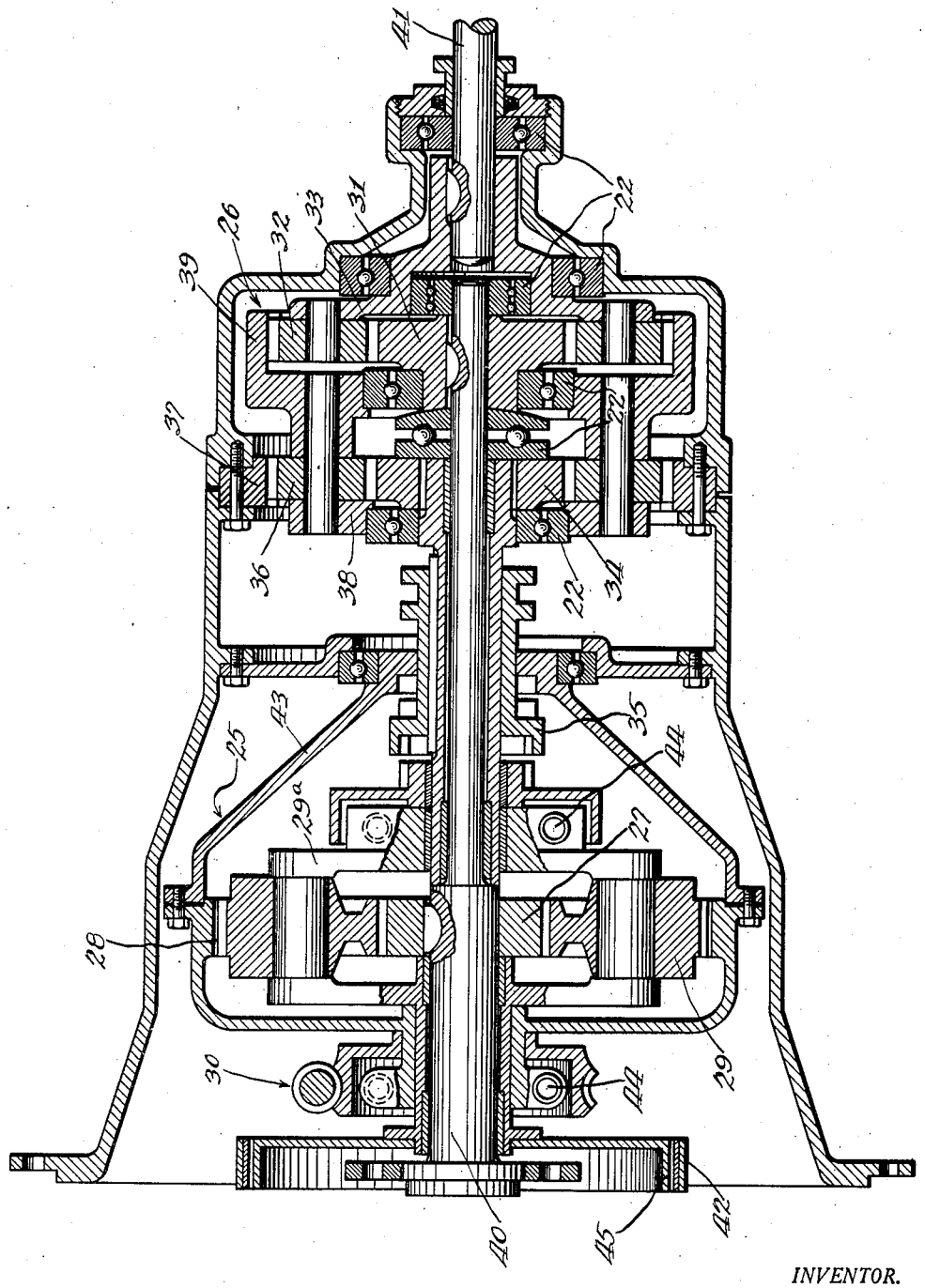
INVENTOR.
Adiel Y. Dodge
By: Jones, Addington, Ames & Seibold.
Attys.

Patented May 28, 1935

2,003,108

UNITED STATES PATENT OFFICE 2,003,108

VARIABLE SPEED TRANSMISSION

Adiel Y. Dodge, South Bend, Ind.

Application December 12, 1922, Serial No. 646,777

4 Claims. (Cl. 74—260)

My invention relates to variable speed transmissions.

One of the objects of my invention is to provide improved means for relieving the flexible speed unit of the necessity of absorbing a large proportion of the increased torque in a transmission embodying a flexible speed reduction unit and a second speed reduction unit in series with the flexible speed reduction unit.

A further object of my invention is to provide improved means for relieving the flexible speed unit of the torque load by means of a reactance member in the second speed reduction unit.

A further object is to provide improved means for relieving the flexible speed unit of the torque load by the use as a gear reactance member of one of the members (such as the ring gear) of a planetary speed reduction in the second unit.

Further objects will appear from the description and claims.

In the drawing, in which one embodiment of my invention is shown,

The figure is an axial sectional view of a parallel series transmission including an alternating impulse unit and a planetary gear unit.

The embodiment of the invention illustrated in the drawing includes a parallel series variable speed transmission comprising an alternating impulse one-way reactance unit 25 and a planetary gear unit 26, said alternating impulse unit 25 comprising a driving sun gear 27, a driven ring gear 28, alternating impulse counterweighted planet gearing 29 between said sun gear 27 and ring gear 28, a gear carrier 29a for the planet gearing 29, and a one-way reactance 30 for cancelling or rectifying the reversely-acting impulses, said planetary gear unit comprising a sun gear 31 rotatable with and at the speed of the sun gear 27, planet gearing 32 meshing with said sun gear 31, a gear carrier 33 for said planet gearing 32, a sun gear 34, a clutch 35 for connecting the sun gear 34 alternatively either with the gear carrier 29a for forward drive or with the ring gear 28 for reverse, a planet gearing 36 meshing with said sun gear 34, a ring gear 37 held against rotation meshing with said planet gearing 36, a gear carrier 38 for said planet gearing 36, and a ring gear 39 rotatable with and at the speed of the gear carrier 38 and meshing with said planet gearing 32.

Before describing in further detail this structure, I will briefly outline the operation. For all forward speeds the clutch 35 is set to connect the sun gear 34 with the gear carrier 29a. The one-way reactance device 30, which may have provisions for reverse and neutral as disclosed in my copending application Serial No. 468,768, filed July 17, 1930, is set to prevent reverse rotation of the ring gear 28 but to enable forward rotation thereof.

The motor drive shaft 40 is then caused to rotate, as a result of which rotation is imparted to the driven gear carrier 33 (connected to the driven shaft 41) through two parallel paths. The first path is from the motor drive shaft 40 through the central intermediate shaft sun gear 31 and planet gearing 32 to the gear carrier 33. The second path is from the motor drive shaft 40 through the sun gear 27, counterweighted impulse planet gearing 29, gear carrier 29a, clutch 35, sun gear 34, planet gearing 36, ring gear 39, and planet gearing 32, to the gear carrier 33. Due to the impulse rectifying reactance 30, the speed of the ring gear 28 will pick up and eventually equal that of the sun gear 27, whereupon the first unit of the series, including the sun gear 27, ring gear 28, and planet gear 29, will rotate without any relative movement of the component parts. In this construction, the ring gear 37 of the second unit, being held against reverse rotation, may be used to absorb a substantial amount of the torque, thus relieving the first unit from excessive torque load. The first unit may properly be described as a variable speed reduction in which the amount of reduction is controlled jointly by inlet speed and outlet torque.

Two different adjustments may be used for securing reverse. In one of these adjustments the rotation controlling band 42 is adjusted to hold the drum against rotation, thus holding the gear carrier 29a against rotation. The one-way impulse rectifier 30 may be set either in neutral or reverse. The clutch 35 will be set to connect the sun gear 34 with the bell-housing 43 which rotates with the ring gear 28. With this setting, a forward rotation will be imparted to the sun gear 31 and a reverse rotation to the ring gear 39. The resultant of these two rotations on the planet gearing 32 determines the speed of the gear carrier 33 and driven shaft.

The transmission from the motor drive shaft 40 to the ring gear 39 is through the sun gear 27, planet gearing 29 (the gear 29a being held against rotation), ring gear 28, clutch 35, sun gear 34, and planet gearing 36, to the gear carrier 38 and gear 39. Suitable cushioning devices 44, described in detail in my copending application Serial No. 493,950, filed November 7, 1930, may be used to equalize and distribute the impulses due to the counterweighted planets 29 and impulse rectifier 30.

In the other setting for reverse, the rotation controlling band 42 is released from engagement with the drum 45 and the impulse rectifier reactance 30 is set to prevent forward rotation but to enable reverse rotation. The clutch 35 may be connected with the gear carrier 29a if a low speed reverse is desired, or with the ring gear 28 if a higher speed reverse is desired. With this setting, the movement of the gear carrier 33 is the resultant of the rotation of the sun gear 31 and ring gear 39, the sun gear 31 being, of course, rotated in a forward direction and the ring gear 39 rotating in reverse and increasing in speed until its rotation overcomes the effect of the forward rotation of the sun gear 31 on the gear carrier 33. The reverse rotation of the ring gear 28 is effected by the action of the impulse rectifier 30, which rectifies the forward impulses due to the counterweighted planets 29, giving them a reverse effect, the result of which is to cause a reverse rotation of the ring gear 28 which is transmitted through the clutch 25, sun gear 34, planet gearing 36, ring gear 39, and planet gearing 32, to the gear carrier 33.

Further modifications will be apparent to those skilled in the art, and it is desired, therefore, that the invention be limited only by the prior art and the scope of the appended claims.

Having thus described my invention, what I claim and desire to secure by Letters Patent is:

1. A variable speed transmission comprising a planetary differential gear set with its reactance member or ring gear fixed, a second planetary differential gear set, and a variable speed unit of a mass inertia impulse type and a drive shaft, said drive shaft being connected to the driving gear of the second differential gear set and also connected to the driving member of the variable speed unit, the driving member of the first differential gear set connected to the reactance member of the second differential gear set, the driven member of the variable speed unit connected to the driving member of the first differential gear set.

2. A variable speed transmission comprising a differential gear set with its reactance member or ring gear fixed, a second differential gear set, and a variable speed unit of a mass inertia impulse type and a drive shaft, said drive shaft being connected to driving gear of second differential gear set and also connected to the driving member of the variable speed unit, the driving member of the first differential gear set connected to the reactance member of the second differential gear set, the driven member of the variable speed unit connected to the driving member of the first differential gear set.

3. A parallel series variable speed transmission comprising an alternating impulse one-way reactance unit and a planetary gear unit, said alternating impulse unit comprising a driving member, a driven member, alternating impulse transmission between said driving member and driven member and a one-way reactance for cancelling or rectifying the reversely-acting impulses, said planetary gear unit comprising a first sun gear rotatable with and at the speed of said driving member, planet gearing meshing with said first sun gear, a first gear carrier for said planet gearing, a second sun gear rotatable with and at the speed of said driven member, a second planet gearing meshing with said second sun gear, a ring gear held against rotation meshing with said second planet gearing, a second gear carrier for said second planet gearing, and a second ring gear rotatable with and at the speed of the second gear carrier and meshing with said first planet gearing.

4. A variable speed transmission comprising a unit in which the speed reduction is torque controlled and a differential gear unit which receives power from the torque-controlled unit, said torque-controlled unit having two output members the speed of one of which is controlled according to the torque thereon and said differential unit having two input members connected with said output members respectively, said differential gear unit comprising a fixed reactance gear and a driven member whose speed is controlled jointly by said two input members, said torque-controlled unit comprising an alternating impulse mechanism and a rectifier for the reverse impulses.

ADIEL Y. DODGE.